(12) United States Patent
Ma (10) Patent No.: US 6,979,700 B2
(45) Date of Patent: Dec. 27, 2005

(54) NON-DEGRADABLE POROUS MATERIALS WITH HIGH SURFACE AREAS

(75) Inventor: Peter X. Ma, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 201 days.

(21) Appl. No.: 10/271,622

(22) Filed: Oct. 16, 2002

(65) Prior Publication Data

US 2003/0071383 A1 Apr. 17, 2003

Related U.S. Application Data

(60) Provisional application No. 60/330,335, filed on Oct. 17, 2001.

(51) Int. Cl.$^7$ .................................................. C08J 9/28
(52) U.S. Cl. ....................................................... 521/64
(58) Field of Search ........................................... 521/64

(56) References Cited

U.S. PATENT DOCUMENTS

| | | |
|---|---|---|
| 5,541,234 A | 7/1996 | Unger et al. |
| 6,146,892 A | 11/2000 | Ma et al. |
| 6,281,257 B1 | 8/2001 | Ma et al. |

OTHER PUBLICATIONS

Young, T.H., L.P. Cheng, D.J. Lin, L. Fane, and W.Y. Chuang, *Mechanisms of PVDF membrane formation by immersion–precipitation in soft (1–octanol) and harsh (water) nonsolvents*, Polymer, 1999, vol. 40, No. 19: pp. 5315–5323.

Meier–Haack, J., W. Lenk, S. Berwald, T. Rieser, and K. Lunkwitz, *Influence of thermal treatment on the pervaporation separation properties of polyamide–6 membranes*, Separation and Purification Technology, 2000, vol. 19, No. 3: pp. 199–207.

Zhang, R. and P.X. Ma, *Synthetic nano–fibrillar extracellular matrices with predesigned macroporous architectures*, J Biomed Mater Res, 2000, vol. 52, No. 2: pp. 430–438.

Zhang, R. and P.X. Ma, *Processing of Polymer Scaffolds: Phase separation, Methods of Tissue Engineering*, Chapter 62, pp. 715–724, 2002, Academic Press.

Ma, P.X. and R. Zhang, *Synthetic nano–scale fibrous extracellular matrix*, J Biomed Mater Res, 1999, vol. 46, No. 1: pp. 60–72.

Zhu, S. and P.X. Ma, *Development of phase structure during the processing of poly(l–lactic acid) scaffolds for tissue engineering*, Polymer Preprints, 2000, vol. 41, No. 2: pp. 1675–1676.

Ruiyun, Z. and P.X. Ma, *Porous poly(L–lactic acid)/apatite composites created by biomimetic process*, J Biomed Mater Res, 1999, vol. 45: pp. 285–293.

Ruiyun, Z. and P.X. Ma, *Poly(α–hydroxyl acids)/hydroxyapatite porous composites for bone–tissue engineering. I. Preparation and morphology*, J Biomed Mater Res, 1999, vol. 44: pp. 446–455.

*Primary Examiner*—Morton Foelak
(74) *Attorney, Agent, or Firm*—Dierker and Associates, P.C.

(57) ABSTRACT

A method for preparing a highly porous, high surface area non-degradable material includes the steps of mixing a non-degradable polymer with a solvent or mixture of solvents; gelling the mixture; and treating the gel under conditions whereby a substantially solvent free porous structure is created having a porosity greater than about 80%. The resultant material is mechanically strong and has an architecture including at least one of nano fibrous, micro fibrous, non fibrous, complex porous structure with nano fibrous architecture, and mixtures thereof.

12 Claims, 13 Drawing Sheets

NON-DEGRADABLE POROUS MATERIALS WITH HIGH SURFACE AREAS

CROSS-REFERENCE TO RELATED APPLICATIONS

This application claims the benefit of U.S. Provisional Patent application Ser. No. 60/330,335, filed Oct. 17, 2001.

BACKGROUND OF THE INVENTION

The present invention relates generally to porous materials having high surface areas, and more particularly to such materials which are non-degradable, and methods for fabricating the same.

Membranes have been typically used for filtration (microfiltration, ultrafiltration, nanofiltration), reverse osmosis (hyperfiltration), dialysis, pervaporation, and gas separation applications. See Scott, K. and R. Hughes, *Industrial Membrane Separation Technology*, 1996, London: Blackie Academic & Professional; Baker, R. W., *Membrane technology and applications*, McGraw-Hill professional engineering, 2000, New York: McGraw-Hill; and Cardew, P. T., M. S. Le, and Royal Society of Chemistry, Process Technology Group, *Membrane processes: a technology guide*, 1998, Cambridge: Royal Society of Chemistry.

A solid membrane can be made of synthetic polymers, natural macromolecules, inorganic compounds, ceramic, or metallic materials. These membrane materials are generally fabricated through sintering, stretching, extrusion, phase inversion and etching, or casting. See Scott, K. and R. Hughes, *Industrial Membrane Separation Technology*, 1996, London: Blackie Academic & Professional; and Pinnau, I. and B. D. Freeman, *Membrane formation and modification*, ACS symposium series, 744, 2000, Washington, D.C.: American Chemical Society, Distributed by Oxford University Press.

Porous membranes are advantageous in their low resistance to mass transfer of solutes in solution due to the increased permeation rate resulting from the pores. Therefore, porous membranes have been employed for separation of mixtures of proteins and macromolecules, salt concentration, sterilization, etc. They can also serve as 3-D matrices for chemical and biochemical mass exchange or reactions to take place, or for cells or other living organisms (e.g., bacteria, viruses, fungi) to grow. Therefore, they can be used as matrices in diagnostic systems, catalysis systems, culture systems, drug delivery systems, wound dressings, etc.

U.S. Pat. No. 6,146,892 discloses a method for producing nanofibrillar matrices utilizing degradable polymers, such as for example, poly(L-lactic acid) (PLLA), poly(D,L-lactic acid-co-glycolic acid) (PLGA), and the like. The disclosed nanofibrillar matrices are highly porous and work well for various applications. However, the pore sizes are very small (on the order of 2 $\mu$m to 3 $\mu$m), which may in some instances render it more difficult for cells to enter. Further, small pore sizes may render it more difficult for material transport, especially materials which are particulate or contain particles. Yet further, the disclosed non-fibrillar structure (a platelet structure) was not as mechanically strong as may be desirable in some instances.

SUMMARY OF THE INVENTION

The present invention comprises a method for preparing a highly porous, high surface area material, comprising the steps of mixing a non-degradable polymer with a solvent or mixture of solvents; gelling the mixture; and treating the gel under conditions whereby a substantially solvent free porous structure is created having a porosity greater than about 80%; wherein the material is mechanically strong and has an architecture comprising at least one of nano fibrous, micro fibrous, non fibrous, complex porous structure with nano fibrous architecture, and mixtures thereof.

BRIEF DESCRIPTION OF THE DRAWINGS

Objects, features and advantages of the present invention will become apparent by reference to the following detailed description and drawings, in which.

DETAILED DESCRIPTION OF THE EMBODIMENTS

It would be desirable to provide highly porous structures having large pore sizes and high specific surface areas. It would further be desirable to provide such structures which are mechanically strong. Still further, it would be desirable to provide a variety of architectures, including but not limited to nano fibrous, micro fibrous, non fibrous, complex porous structure with nano fibrous architecture, and the like.

The present invention is predicated upon the unexpected and fortuitous discovery that a recently discovered phase separation technique may be utilized to render highly porous, mechanically strong, high surface areas materials having varied architectures (e.g. nano fibrous, micro fibrous, non fibrous, complex porous structure with nano fibrous architecture) by using non-degradable polymers. The novel materials of the present invention may have pore sizes ranging between about 30 μm and about 300 μm, with similarly sized connections. In contrast, it had been expected that, whatever polymer was used, if the process as disclosed in U.S. Pat. No. 6,146,892 were followed, it would render primarily nanofibrous structures. Further, it had been expected that if a non-nanofibrous structure were created, it may not be as mechanically strong as desirable for certain applications.

High surface areas are very desirable in that, if a material has a very high surface area, less of the material (compared to a low surface area material) may be used in order to render the same result; i.e. the reaction is more efficient.

Some exemplary polymers suitable for the present invention comprise at least one of natural or synthetic hydrophilic polymers, natural or synthetic hydrophobic polymers, natural or synthetic amphiphilic polymers, and mixtures thereof.

Some exemplary, non-limitative water soluble (hydrophilic) polymers include polyvinyl alcohol, polyethylene oxide, polymethacrylic acid (PMAA), polyacrylic acid, polyethylene glycol, alginate, collagen, gelatin, hyaluronic acid, and mixtures thereof. It is to be understood that the natural macromolecules such as alginate, collagen, gelatin and hyaluronic acid are generally not degradable unless treated with appropriate enzymes.

Some exemplary, non-limitative water insoluble (hydrophobic) polymers include polytetrafluoroethylene (PTFE), polyvinylchloride (PVC), polyamides (PA, Nylons), polyethylenes (PE), polysulfones, polyethersulphone, polypropylenes (PP), silicon rubbers, polystyrenes, polycarbonates, polyesters, polyacrylonitrile (PAN), polyimides, polyetheretherketone (PEEK), polymethylmethacrylate (PMMA), polyvinylacetate (PVAc), polyphenylene oxide, cellulose and its derivatives, polypropylene oxide (PPO), polyvinylidene fluoride (PVDF), polybutylene, and mixtures thereof.

It is to be understood that any suitable solvents may be used in the present invention, provided that the solvent(s) performs suitably within the context of the present inventive method. In an embodiment of the present invention, the solvent comprises at least one of water, acetic acid, formic acid, tetrahydrofuran (THF), dimethylsulfoxide (DMSO), dioxane, benzene, and mixtures thereof.

The dissolution/precipitation process is one of the most frequently used techniques to manufacture membrane materials. See, Young, T. H., L. P. Cheng, D. J. Lin, L. Fane, and W. Y. Chuang, *Mechanisms of PVDF membrane formation by immersion-precipitation in soft (1-octanol) and harsh (water) nonsolvents*, Polymer, 1999, 40(19): p. 5315–5323. In that technique, a polymer is first dissolved in a good solvent and cast on a substrate. The cast material is then immersed in a non-solvent or poor solvent for the polymer to induce polymer precipitation from the solution. Industrial membranes fabricated with such techniques have a specific surface area typically lower than 5 $m^2/g$ (see Meier-Haack, J., W. Lenk, S. Berwald, T. Rieser, and K. Lunkwitz, *Influence of thermal treatment on the pervaporation separation properties of polyamide-6 membranes*, Separation and Purification Technology, 2000. 19(3): p. 199–207), and typically with an intermediate or low porosity (70% or lower).

The inventor of the present invention has recently developed a novel phase-separation technique to generate porous polymeric materials (porosity is typically higher than 80 or 90%) with a unique nano fibrous structure (an average fiber diameter ranging from 50 nm to 500 nm). See Ma, P. X. and R. Zhang, *Fibrillar Matrices*, in U.S. Pat. No. 6,146,892, 2000, which Patent is incorporated by reference herein in its entirety; Zhang, R. and P. X. Ma, *Synthetic nano-fibrillar extracellular matrices with predesigned macroporous architectures*, J Biomed Mater Res, 2000, 52(2): p. 430–438; and Zhang, R. and P. X. Ma, *Fabrication of polymer scaffolds: Phase separation*, in *Methods of Tissue Engineering*, A. Atala and R. Lanza, Editors, 2001, Academic Press: San Diego, Calif. (in press).

With the new techniques, dissolution/gelation (phase-separation)/solvent exchange (may be optional)/freezing/freeze-drying are some illustrative sequences to create the porous nano fibrous structure.

In contrast, as stated hereinabove, the present invention has unexpectedly and fortuitously discovered new porous polymeric materials with a variety of porous architectures (e.g., nano fibrous, micro fibrous, or non fibrous, or complex porous structure with nano fibrous architecture) and very high surface areas, which are fabricated with the new techniques. Their structures and properties generally depend on either the polymer/solvent systems and/or the phase-separation conditions; such as type of polymer(s), type of solvent(s), mixture ratio of two or more types of polymer(s) and/or solvent(s), polymer concentration, phase-separation temperature and so forth.

This invention discloses polymeric (or substantially polymeric) materials with very high surface areas, such as >5 $m^2/g$, >10 $m^2/g$, >20 $m^2/g$, >50 $m^2/g$, or much higher, and having high porosity such as 70%, 80%, 90% or even higher, using the new fabrication techniques.

In an embodiment, the novel materials of the present invention have a specific surface area ranging between about 5 $m^2/g$ and about 1000 $m^2/g$. In an alternate embodiment, the materials have a specific surface area ranging between about 10 $m^2/g$ and about 500 $m^2/g$. In yet another alternate embodiment, the materials have a specific surface area ranging between about 20 $m^2/g$ and about 200 $m^2/g$.

The novel materials of the present invention may have pore sizes ranging between about 30 $\mu$m and about 300 $\mu$m, with similarly sized connections. In an alternate embodiment, the novel materials of the present invention may have pore sizes ranging between about 50 $\mu$m and about 100 $\mu$m, with similarly sized connections.

The polymers may be synthetic or natural. They may be homopolymers (with one structural unit) or copolymers (with two or more structural units). The copolymers may be random copolymers, block copolymers, graft copolymers, and/or mixtures thereof. They may be one single polymer type or polymer blends. The materials may also be a composite of polymeric and non-polymeric materials. Further, it is to be understood that chemically or biologically active or inert materials may be involved as additives or as major components. These polymers may be physically, chemically, and/or biologically modified to improve certain properties or function. It is to be yet further understood that such modification may be carried out before fabrication (raw materials) or after fabrication of the porous materials.

Fabrication Techniques

1. Polymer Solution Preparation

Accurately weighed polymer(s) was added into a flask, and calculated amount of solvent(s) was added into the flask to make a polymer solution of a desired concentration. In an embodiment, the polymer solution (polymer/solvent mixture) contains between about 1% and about 20% polymer. Typically, the polymers were dissolved for two hours or longer to ensure a homogeneous solution when stirred with a magnetic stirrer at either room temperature or an elevated temperature (at or higher than room temperature, for example, 20° C., 40° C., 50° C., 60° C., 70° C. and so forth).

2. Porous Polymer Material Fabrication

Typically, four processing steps were taken to prepare a porous polymer material from a polymer solution: (A) Polymer solution (typically pre-warmed to a temperature at or higher than room temperature, for example, 20° C., 40° C., 50° C., 60° C., 70° C., 100° C. and so forth) was added into a mold or container (e.g., Teflon vial). The mold containing the polymer solution was then rapidly transferred into a cooling device (e.g. a refrigerator or freezer) at a preset temperature to induce gelation. The cooling device is maintained at a predetermined temperature between about room temperature and about liquid nitrogen. The gelation time depended on temperature, solvent(s) and the polymer concentration of the solution. After gelation, the gel was kept at the gelling temperature for typically 2 hours or longer. (B) The mold containing the gel was immersed in a liquid (poor or non-solvent for the polymer) such as distilled water for solvent exchange. The water (or other liquid) was changed three times a day for two days. (C) The gel was removed from the water (or other liquid) and blotted by a piece of filter paper, and then was placed in a device set at a desired freezing temperature, the freezing temperature ranging between about room temperature and about liquid nitrogen. In an embodiment, the freezing temperature ranges between about room temperature and about −20° C. In an alternate embodiment, the freezing temperature ranges between about room temperature and about −70° C. The gel was frozen for typically 2 hours or longer. (D) The frozen gel was taken into a freeze-drying vessel, and was freeze-dried under a predetermined vacuum and at a predetermined temperature. It is to be understood that any suitable vacuum and temperature may be used; however, in an embodiment, a vacuum lower than 0.5 mmHg was used at a temperature ranging between about −5° C. and about −10° C. The frozen gel was freeze dried in an ice/salt bath for one week. The dried porous polymer material was then kept in a desiccator until characterization.

Characterization

The morphologies of the porous materials were examined with scanning electron microscopy (SEM) (S-3200N, Hitachi, Japan) at 15 kV. The samples were coated with gold using a sputter coater (Desk-II, Denton Vacuum Inc.) for 200 seconds with a gas pressure of lower than about 50 mtorr and a current of about 40 mA.

The compressive mechanical properties of the scaffolds were measured with an MTS mechanical tester (Model: Synergie 200, MTS Systems Corporation, Cary, N.C.). Cubic specimens with a side length of 5 mm were compressed with a cross-head speed of 0.5 mm/min. The compressive modulus was determined from the initial linear region of the stress-strain curve, and the yield strength was determined from the cross point of the two tangents on the stress-strain curve around the yield point. At least six specimens were tested for each sample, and the averages and standard deviations were calculated.

To further illustrate the present invention, the following examples are given. It is to be understood that these examples are provided for illustrative purposes and are not to be construed as limiting the scope of the present invention.

EXAMPLES

Figure 1A:
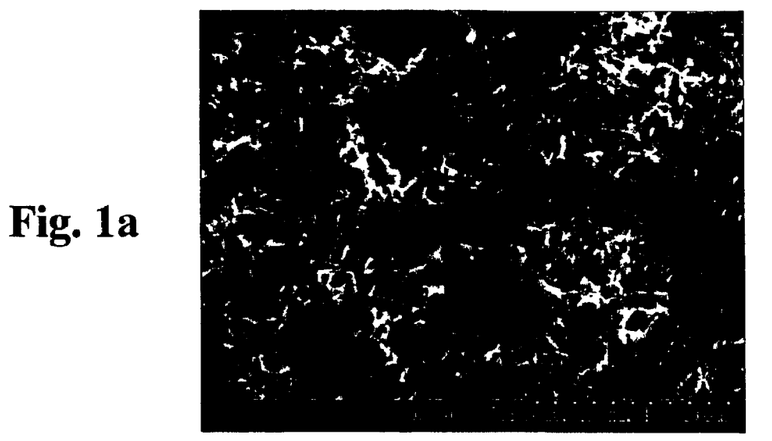
FIG. 1a is a SEM micrograph of PA-6,6 foam prepared from a 10% PA-6,6 solution in a mixed solvent of acetic acid/water (80/20) at the following gelation temperature: room temperature.
Figure 1B:
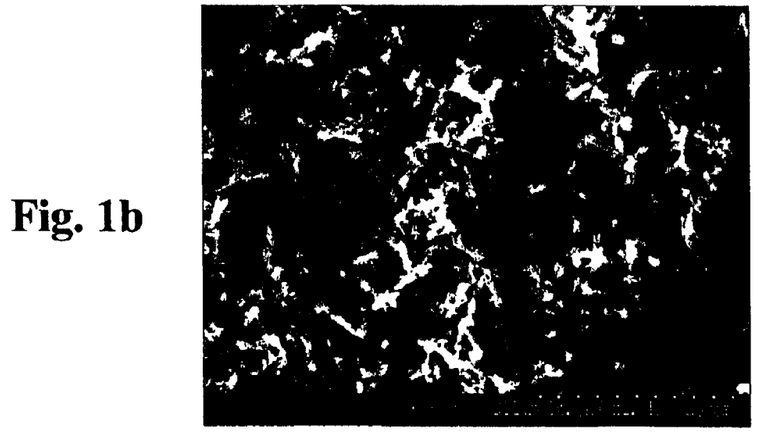
FIG. 1b is a SEM micrograph of PA-6,6 foam prepared from a 10% PA-6,6 solution in a mixed solvent of acetic acid/water (80/20) at the following gelation temperature: −20° C.
Figure 1C:
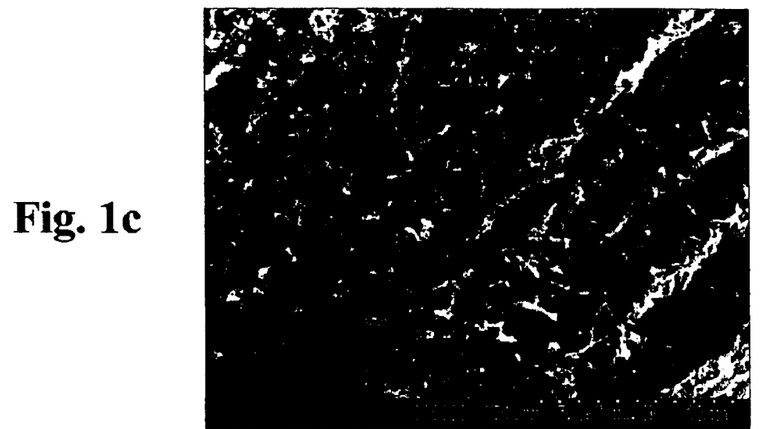
FIG. 1c is a SEM micrograph of PA-6,6 foam prepared from a 10% PA-6,6 solution in a mixed solvent of acetic acid/water (80/20) at the following gelation temperature: −70° C.
Figure 1D:
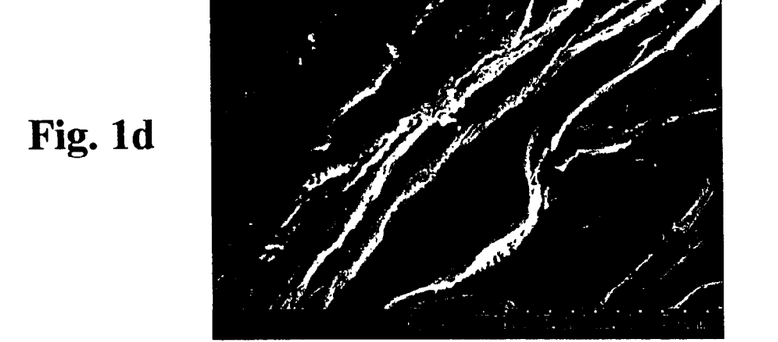
FIG. 1d is a SEM micrograph of PA-6,6 foam prepared from a 10% PA-6,6 solution in a mixed solvent of acetic acid/water (80/20) at the following gelation temperature: in liquid nitrogen.

1. PA-6,6 in Acetic Acid and Water:

PA-6,6 was completely dissolved in pure acetic acid or acetic acid/water mixture with water content ranging from 10 to 30%. The gelation of the solution was observed when water content was higher than 20%. The gelation occurred when the temperature was from room temperature to liquid nitrogen. The typical morphologies of the resulting porous foams are shown in FIGS. 1a–1d. FIGS. 1a and 1b are partially nano fibrous; and FIGS. 1c and 1d are non fibrous.

Figure 2A:
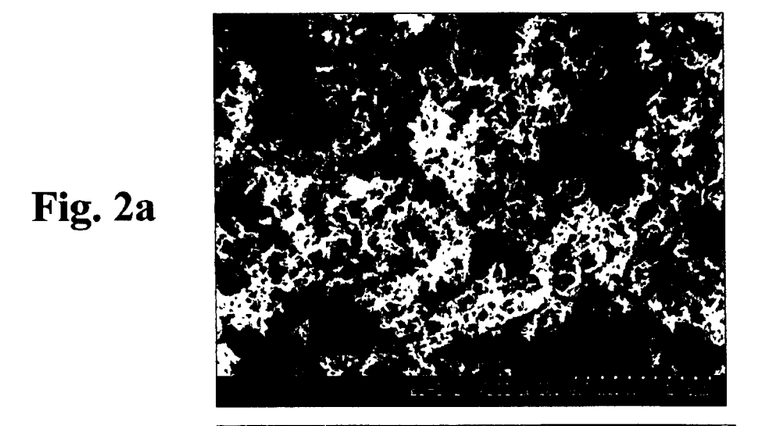
FIG. 2a is a SEM micrograph of PA-6,6 foam prepared from a 10% PA-6,6 solution in a mixed solvent of formic acid/water (70/30) at the following gelation temperature: room temperature.
Figure 2B:
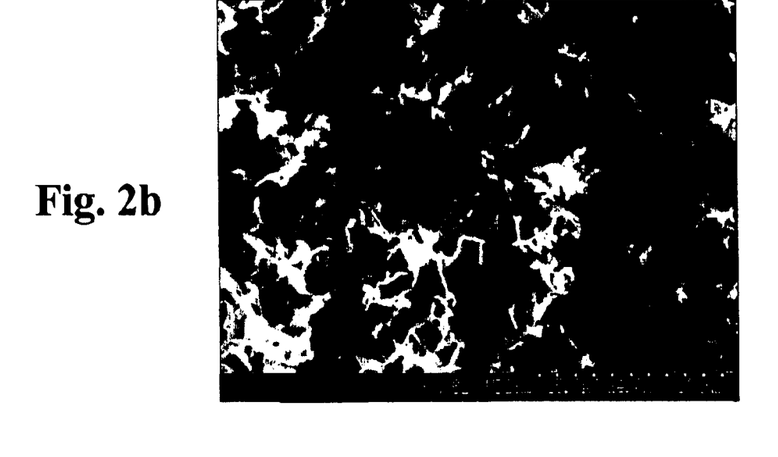
FIG. 2b is a SEM micrograph of PA-6,6 foam prepared from a 10% PA-6,6 solution in a mixed solvent of formic acid/water (70/30) at the following gelation temperature: −20° C.
Figure 2C:
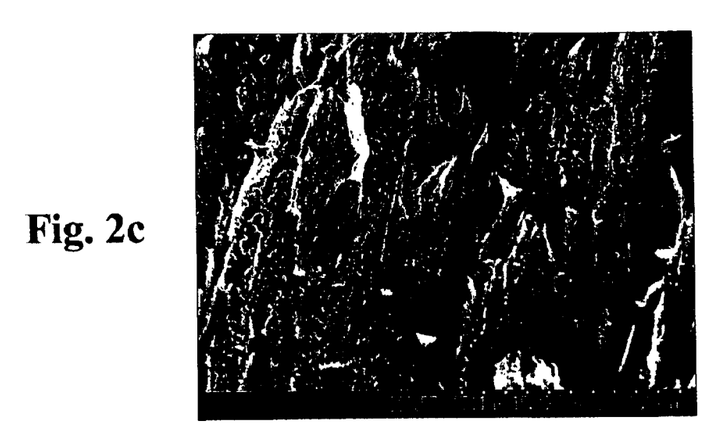
FIG. 2c is a SEM micrograph of PA-6,6 foam prepared from a 10% PA-6,6 solution in a mixed solvent of formic acid/water (70/30) at the following gelation temperature: −70° C., at ×500 magnification.
Figure 2D:
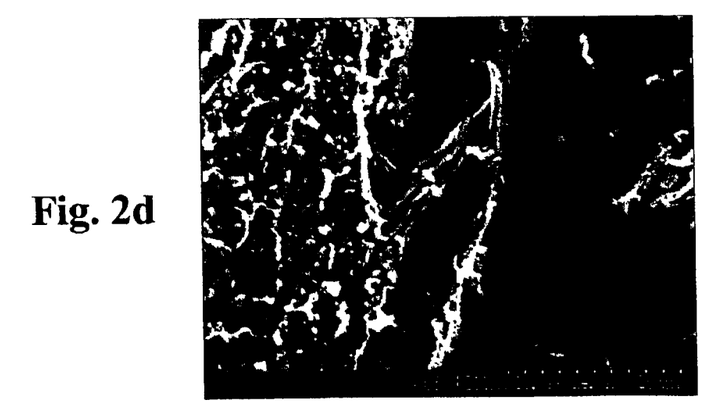
FIG. 2d is a SEM micrograph of PA-6,6 foam prepared from a 10% PA-6,6 solution in a mixed solvent of formic acid/water (70/30) at the following gelation temperature: −70° C., at ×4000 magnification.
Figure 3A:
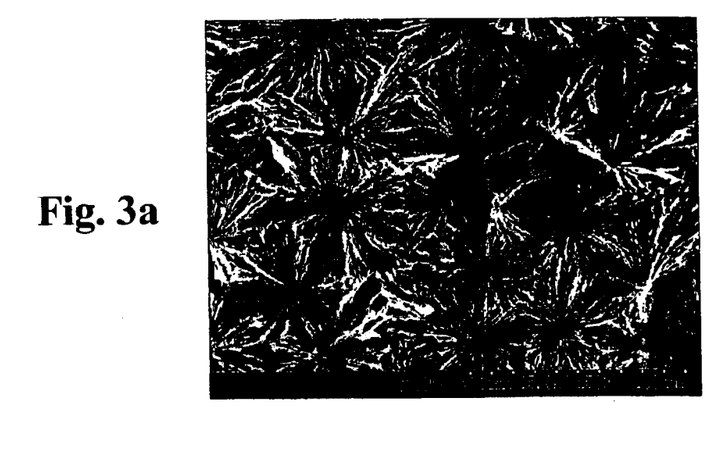
FIG. 3a is a SEM micrograph of PA-6,6 foam prepared from a 10% PA-6,6 solution in a mixed solvent of formic acid/water (70/30) quenched in liquid nitrogen, at ×500 magnification.
Figure 3B:
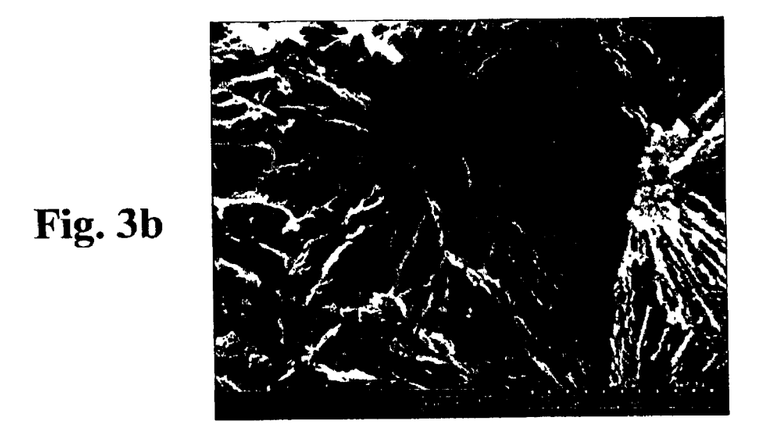
FIG. 3b is a SEM micrograph of PA-6,6 foam prepared from a 10% PA-6,6 solution in a mixed solvent of formic acid/water (70/30) quenched in liquid nitrogen, at ×2000 magnification.
Figure 3C:
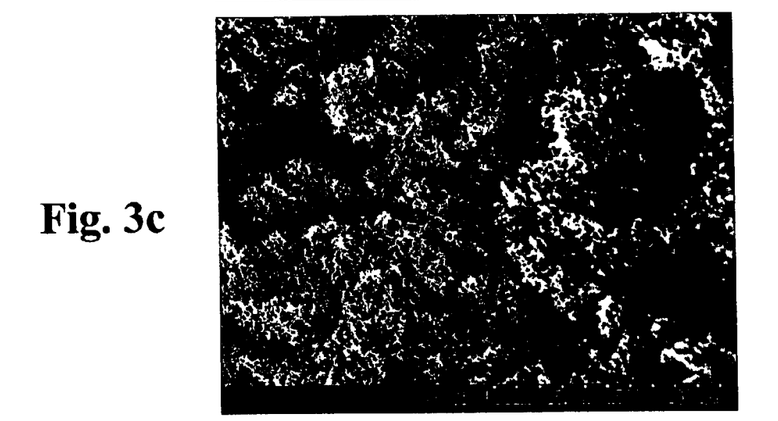
FIG. 3c is a SEM micrograph of PA-6,6 foam prepared from a 10% PA-6,6 solution in a mixed solvent of formic acid/water (80/20) quenched in liquid nitrogen, at ×500 magnification.
Figure 3D:
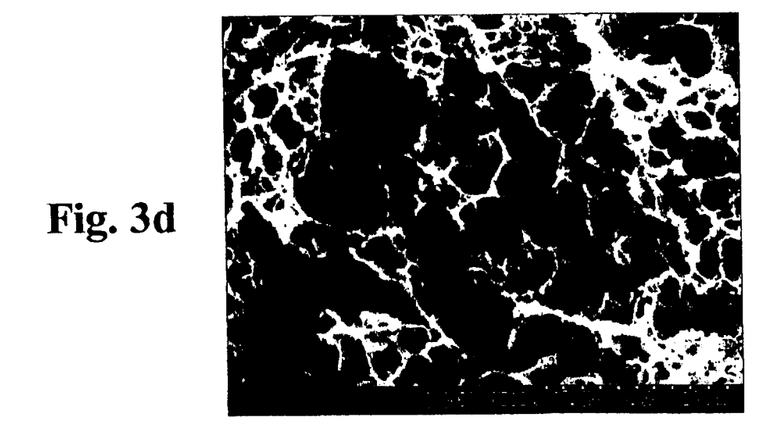
FIG. 3d is a SEM micrograph of PA-6,6 foam prepared from a 10% PA-6,6 solution in a mixed solvent of formic acid/water (80/20) quenched in liquid nitrogen, at ×4000 magnification.
Figure 4A:
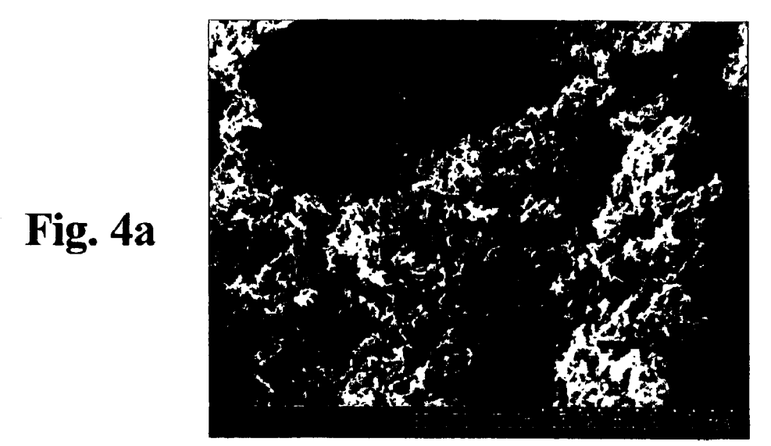
FIG. 4a is a SEM micrograph of PA-6,6 foam prepared from a 5% PA-6,6 solution in a mixed solvent of formic acid/water (70/30) at the following gelation temperature: room temperature.
Figure 4B:
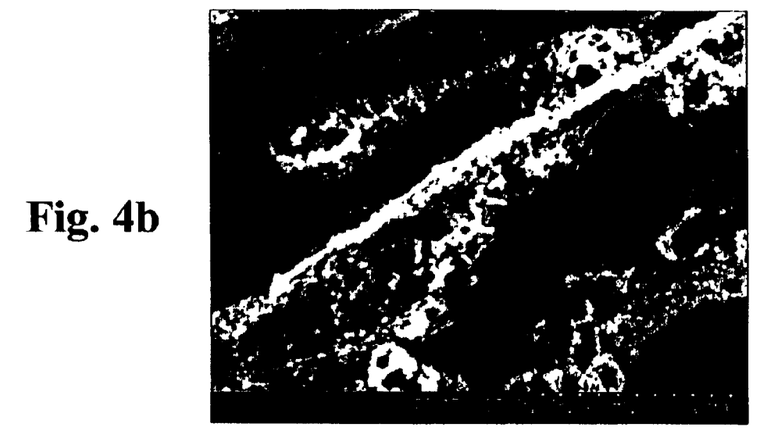
FIG. 4b is a SEM micrograph of PA-6,6 foam prepared from a 5% PA-6,6 solution in a mixed solvent of formic acid/water (70/30) at the following gelation temperature: −20° C.
Figure 4C:
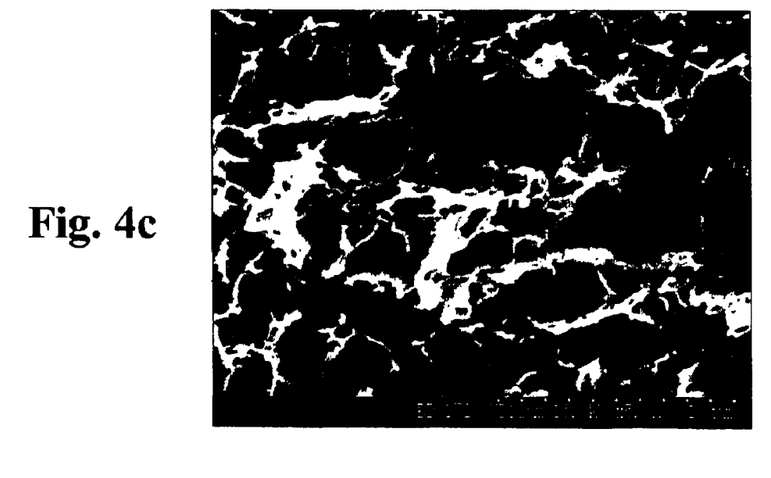
FIG. 4c is a SEM micrograph of PA-6,6 foam prepared from a 5% PA-6,6 solution in a mixed solvent of formic acid/water (70/30) at the following gelation temperature: −70° C.
Figure 4D:
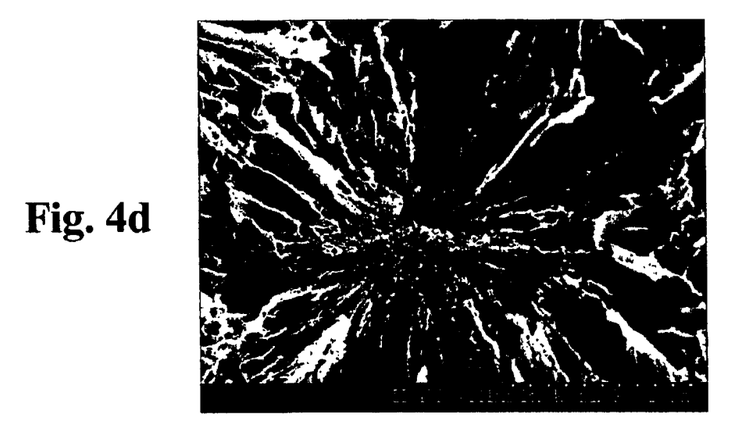
FIG. 4d is a SEM micrograph of PA-6,6 foam prepared from a 5% PA-6,6 solution in a mixed solvent of formic acid/water (70/30) at the following gelation temperature: in liquid nitrogen.
Figure 5A:
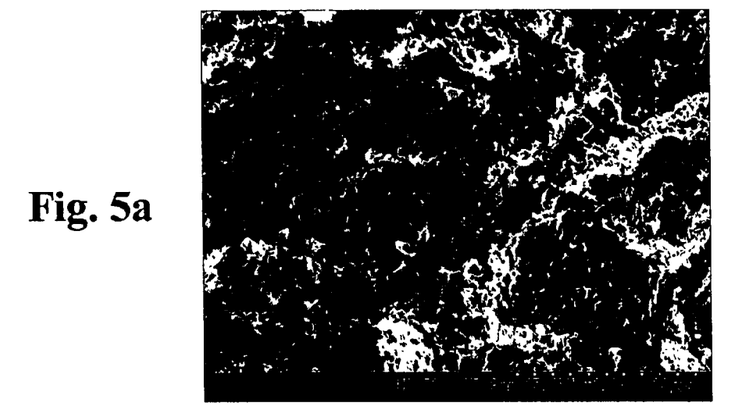
FIG. 5a is a SEM micrograph of PA-6,6 foam prepared from a 5% PA-6,6 solution in a mixed solvent of formic acid/water (70/30) at the following gelation temperature (dioxane instead of water was used for solvent exchange): room temperature.
Figure 5B:
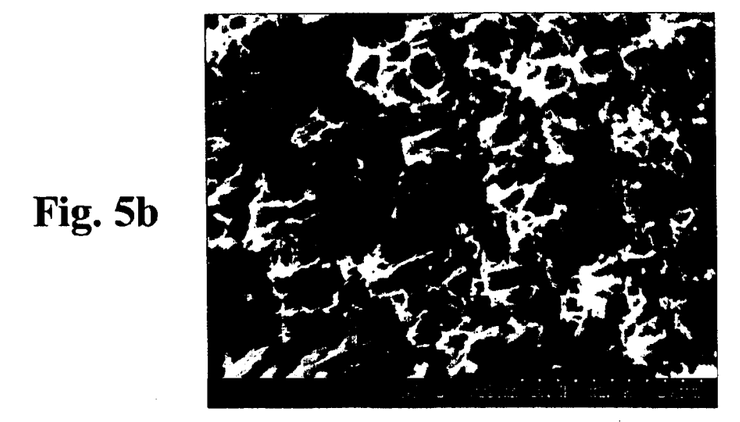
FIG. 5b is a SEM micrograph of PA-6,6 foam prepared from a 5% PA-6,6 solution in a mixed solvent of formic acid/water (70/30) at the following gelation temperature (dioxane instead of water was used for solvent exchange): −20° C.
Figure 5C:
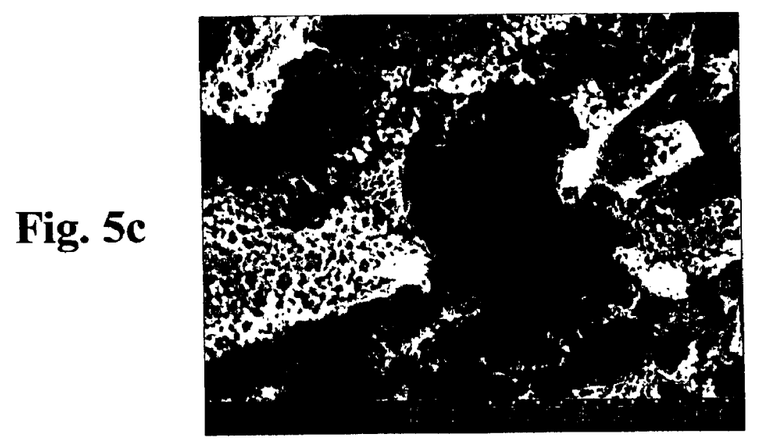
FIG. 5c is a SEM micrograph of PA-6,6 foam prepared from a 5% PA-6,6 solution in a mixed solvent of formic acid/water (70/30) at the following gelation temperature (dioxane instead of water was used for solvent exchange): −70° C.
Figure 5D:
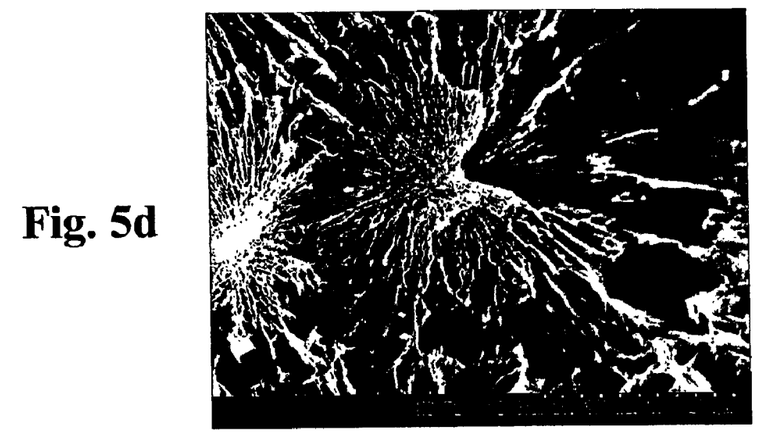
FIG. 5d is a SEM micrograph of PA-6,6 foam prepared from a 5% PA-6,6 solution in a mixed solvent of formic acid/water (70/30) at the following gelation temperature (dioxane instead of water was used for solvent exchange): in liquid nitrogen.
Figure 6A:
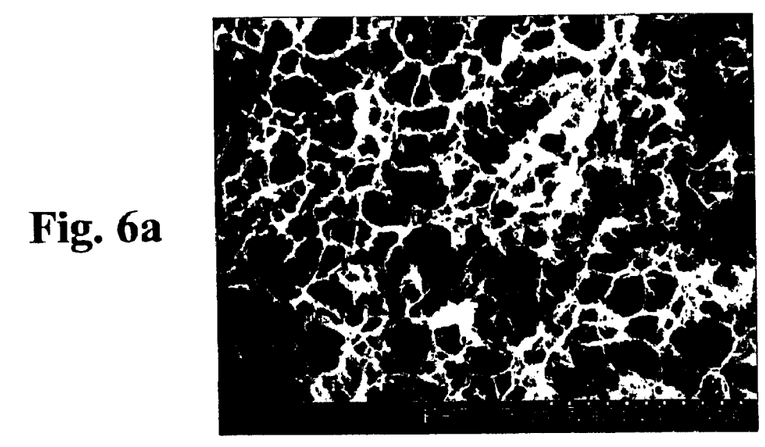
FIG. 6a is a SEM micrograph of PA-6,6 foam prepared from a 5% PA-6,6 solution in a mixed solvent of formic acid/THF (40/60) at the following gelation temperature: room temperature.
Figure 6B:
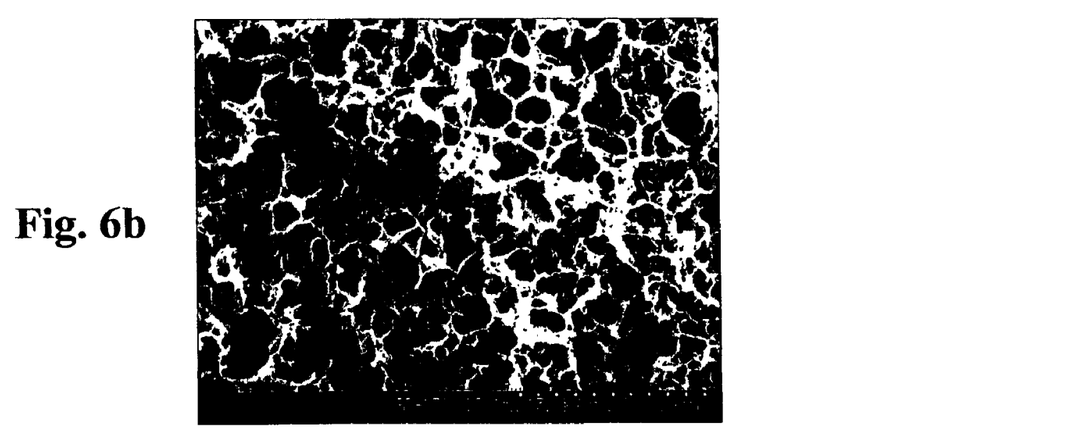
FIG. 6b is a SEM micrograph of PA-6,6 foam prepared from a 5% PA-6,6 solution in a mixed solvent of formic acid/THF (40/60) at the following gelation temperature: −20° C.
Figure 6C:
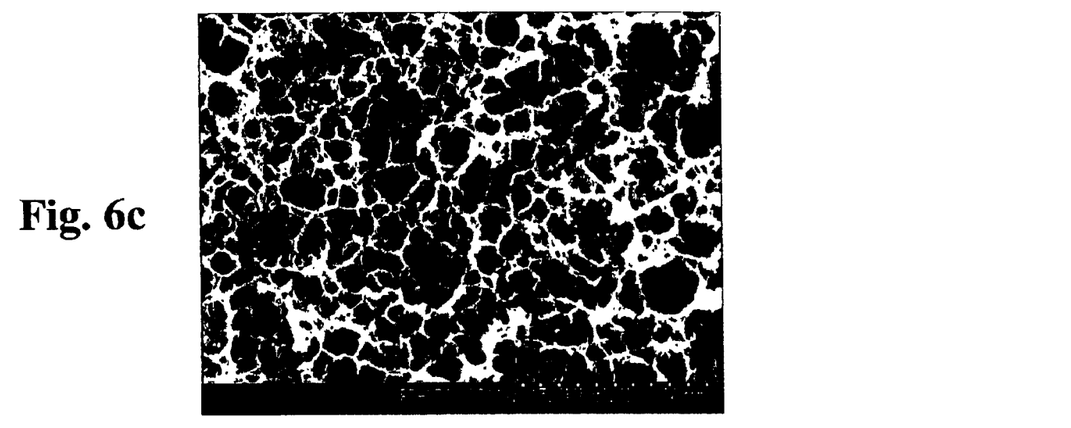
FIG. 6c is a SEM micrograph of PA-6,6 foam prepared from a 5% PA-6,6 solution in a mixed solvent of formic acid/THF (40/60) at the following gelation temperature: −70° C.
Figure 6D:
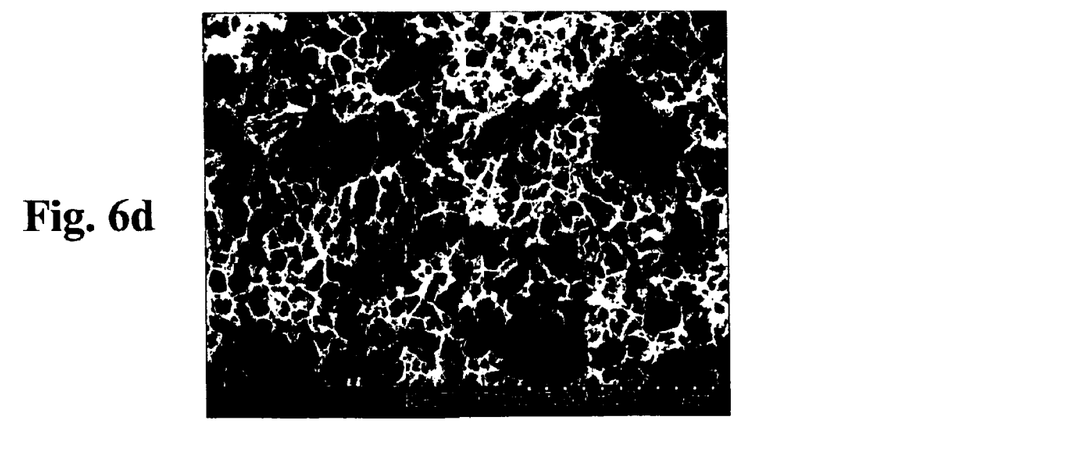
FIG. 6d is a SEM micrograph of PA-6,6 foam prepared from a 5% PA-6,6 solution in a mixed solvent of formic acid/THF (40/60) at the following gelation temperature: in liquid nitrogen.

2. PA-6,6 in Formic Acid and Water:

PA-6,6 was completely dissolved in pure formic acid or a mixture of formic acid and water with water content ranging from 0% to 35%. When the concentration of the polymer was higher than 10%, gelation was observed when the water content of the solvent was higher than 20% and the temperature was lower than −20° C. For the polymer concentration lower than 5%, gelation was observed when water content was higher than 30%. The gelation was observed in a temperature range from −20° C. to liquid nitrogen. The liquid used for solvent exchange was either water or tetrahydrofuran (THF). The typical morphologies of the foams are shown in FIGS. 2a through 5d. FIGS. 2a and 2b are partially nano fibrous. FIGS. 2c and 2d have morphologies including several different structures. FIGS. 3a and 3b are non fibrous. FIGS. 3c and 3d are partially nano fibrous. FIGS. 4a, 4b and 4c are complex porous structure with nano fibrous architecture. FIG. 4d is a spherical structure. FIGS. 5a–5d are non fibrous.

3. PA-6,6 in Formic Acid and tetrahydrofuran (THF):

PA-6,6 was completely dissolved in formic acid/THF co-solvent with THF content ranging from 5% to 60%. Gelation was observed when THF content was 60%. The gelation temperature range was from room temperature to liquid nitrogen. The typical morphologies of the foams are shown in FIGS. 6a–6d. FIGS. 6a–6d are partially nano fibrous with interconnect structure and high surface area.

Figure 7A:
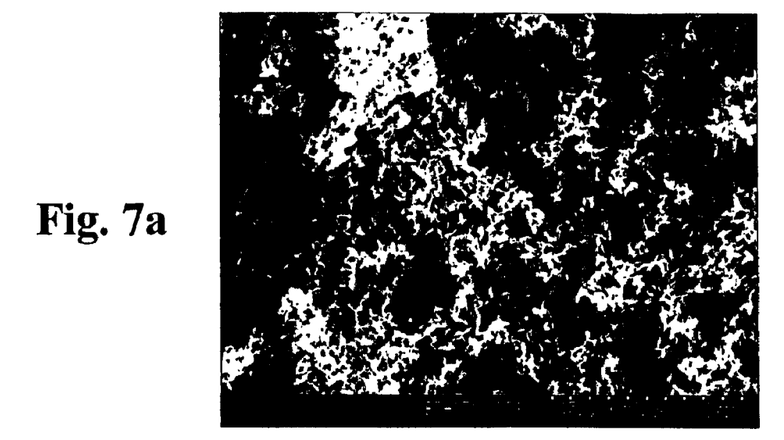
FIG. 7a is a SEM micrograph of PA-6,6 foam prepared from a 5% PA-6,6 solution in a mixed solvent of formic acid/acetic acid/water (64/16/20) at the following gelation temperature: −20° C.
Figure 7B:
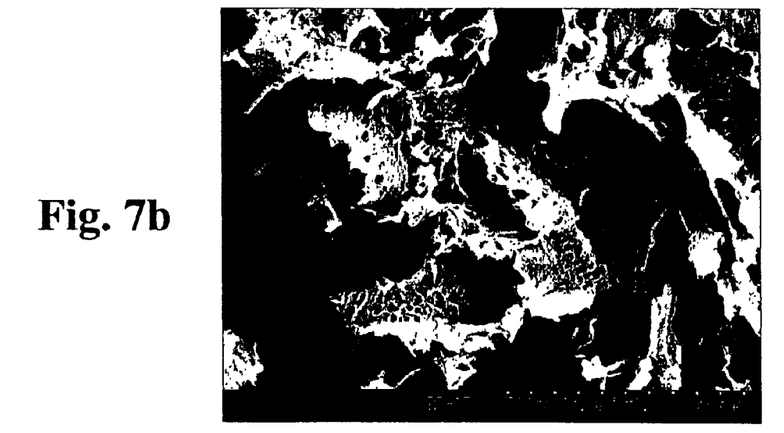
FIG. 7b is a SEM micrograph of PA-6,6 foam prepared from a 5% PA-6,6 solution in a mixed solvent of formic acid/acetic acid/water (64/16/20) at the following gelation temperature: −70° C.
Figure 7C:
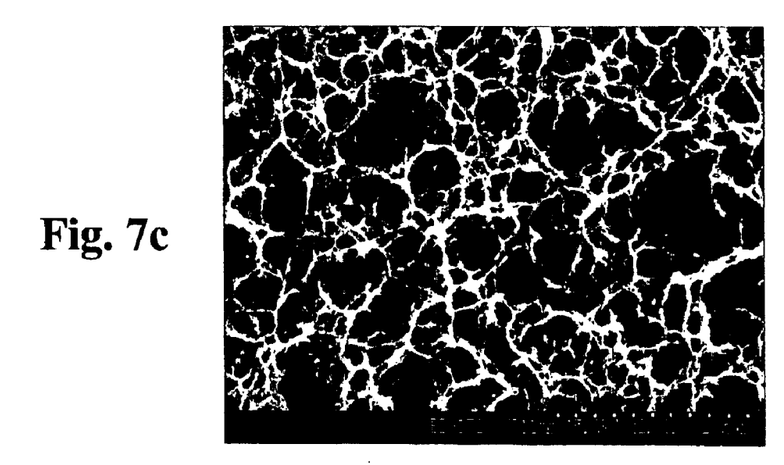
FIG. 7c is a SEM micrograph of PA-6,6 foam prepared from a 5% PA-6,6 solution in a mixed solvent of formic acid/acetic acid/water (64/16/20) at the following gelation temperature: in liquid nitrogen.

4. PA-6,6 in Formic Acid/Acetic Acid (80/20) and Water:

PA-6,6 was completely dissolved in formic acid/acetic acid (80/20)/water co-solvent with water content ranging from 0% to 30%. Gelation of the solution was observed when the water content was higher than 20%. The gelation temperature was from room temperature to liquid nitrogen. The typical morphologies of the foams are shown in FIGS. 7a–7c. FIG. 7b is non fibrous. FIG. 7c is partially nano fibrous.

Figure 8A:
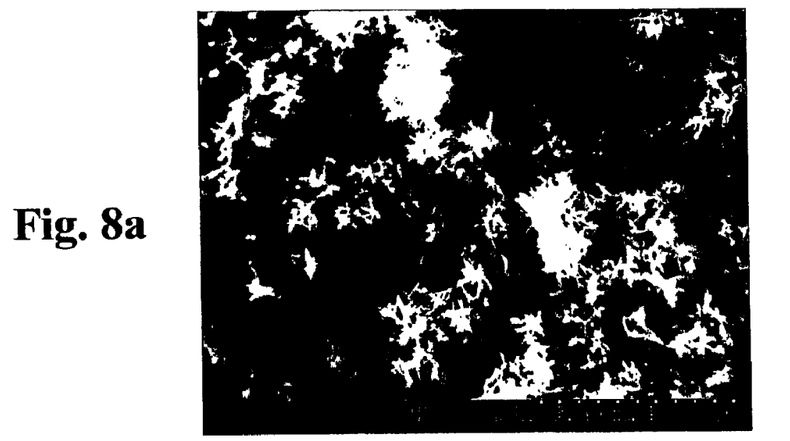
FIG. 8a is a SEM micrograph of PA-6,6/PA-6 (50/50) polymer blend foam prepared from a 5% PA-6,6/PA-6 solution in a mixed solvent of formic acid/water (70/30) at the following gelation temperature: −20° C.
Figure 8B:
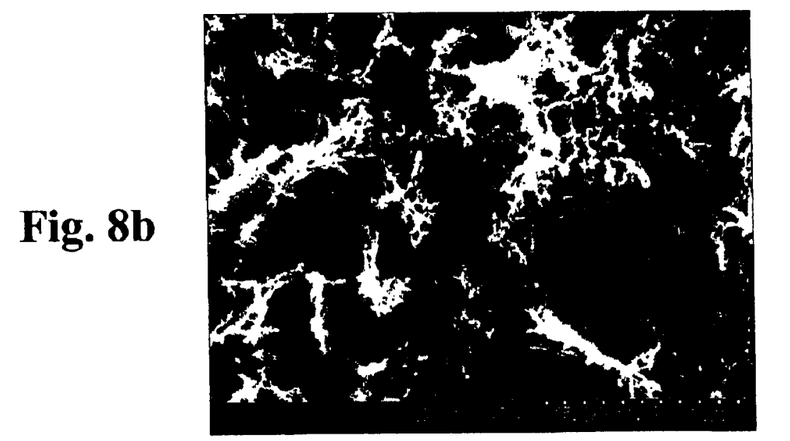
FIG. 8b is a SEM micrograph of PA-6,6/PA-6 (50/50) polymer blend foam prepared from a 5% PA-6,6/PA-6 solution in a mixed solvent of formic acid/water (70/30) at the following gelation temperature: −70° C.
Figure 8C:
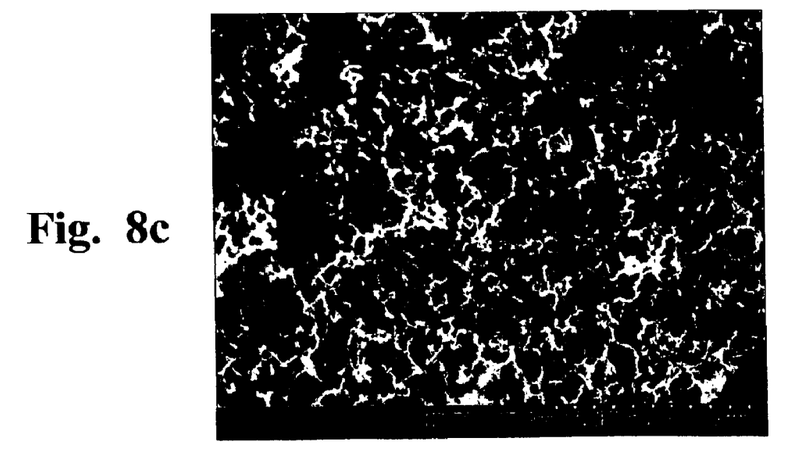
FIG. 8c is a SEM micrograph of PA-6,6/PA-6 (50/50) polymer blend foam prepared from a 5% PA-6,6/PA-6 solution in a mixed solvent of formic acid/water (70/30) at the following gelation temperature: in liquid nitrogen.
Figure 9A:
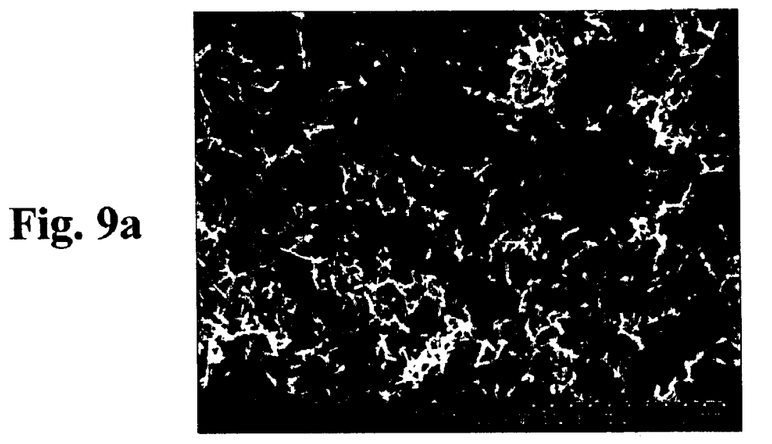
FIG. 9a is a SEM micrograph of PA-6 foam prepared from a 5% PA-6 solution in a mixed solvent of acetic acid/water (60/40) at the following gelation temperature: −20° C.
Figure 9B:
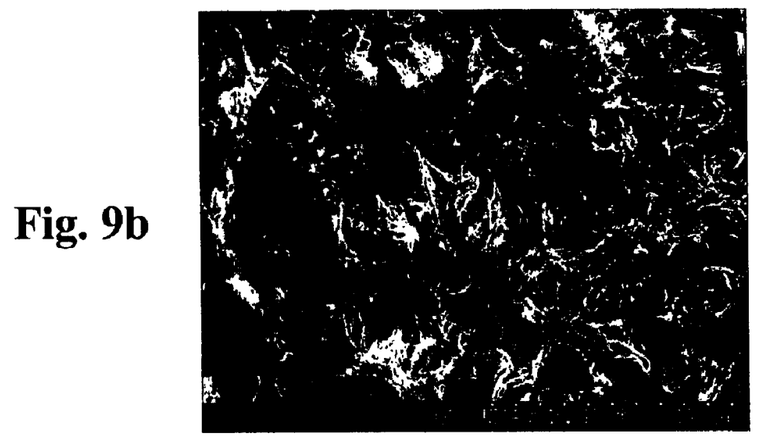
FIG. 9b is a SEM micrograph of PA-6 foam prepared from a 5% PA-6 solution in a mixed solvent of acetic acid/water (60/40) at the following gelation temperature: in liquid nitrogen, at ×500 magnification.
Figure 9C:
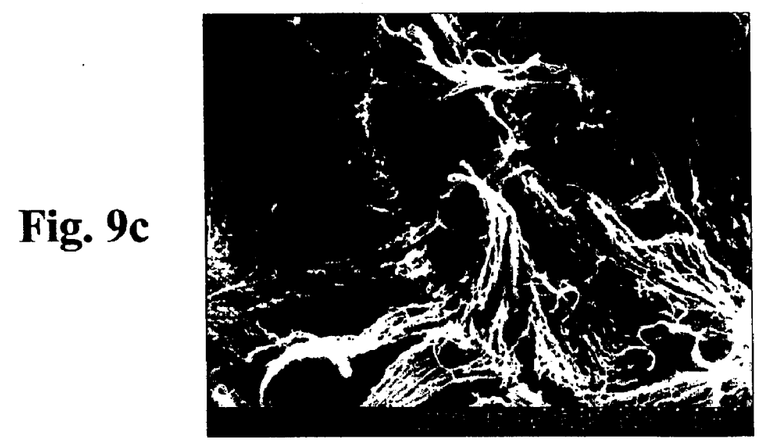
FIG. 9c is a SEM micrograph of PA-6 foam prepared from a 5% PA-6 solution in a mixed solvent of acetic acid/water (60/40) at the following gelation temperature: in liquid nitrogen, at ×2000 magnification.
Figure 9D:
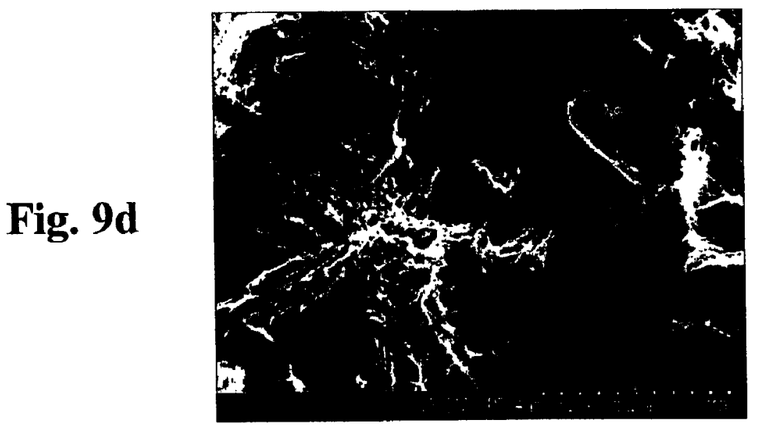
FIG. 9d is a SEM micrograph of PA-6 foam prepared from a 5% PA-6 solution in a mixed solvent of acetic acid/water (60/40) at the following gelation temperature: in liquid nitrogen, at ×2000 magnification.
Figure 10A:
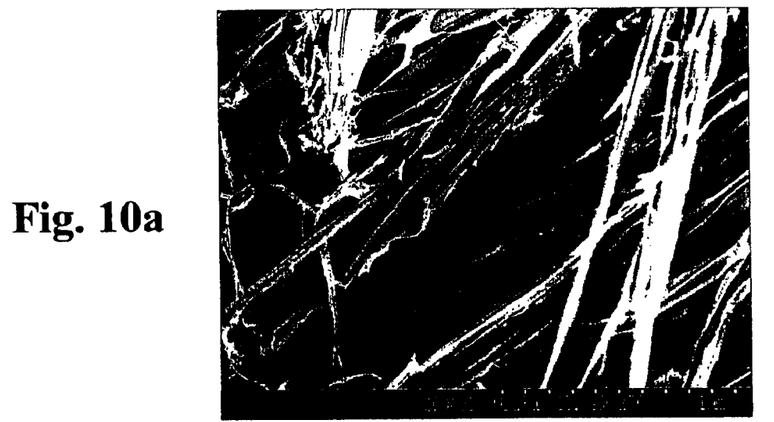
FIG. 10a is a SEM micrograph of porous PVDF material prepared with PVDF solution in DMSO, phase-separation temperature of −18° C., low magnification.
Figure 10B:
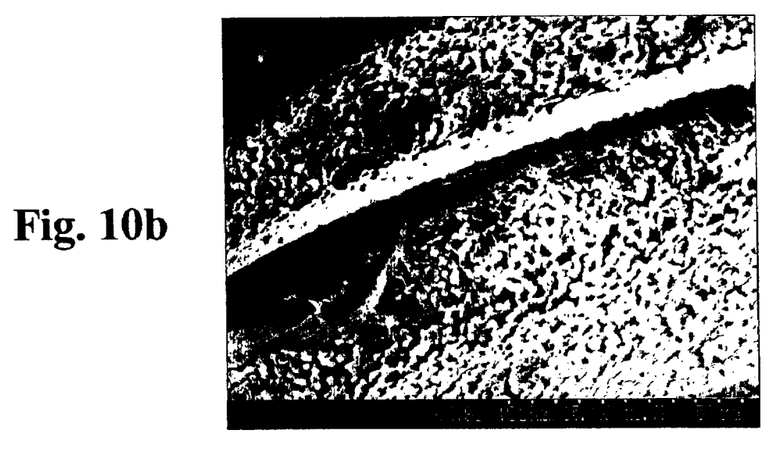
FIG. 10b is a SEM micrograph of porous PVDF material prepared with PVDF solution in DMSO, phase-separation temperature of −18° C., intermediate magnification.
Figure 10C:
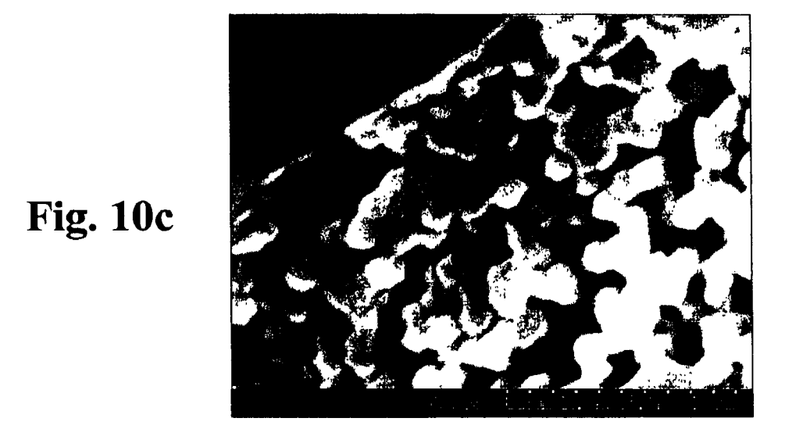
FIG. 10c is a SEM micrograph of porous PVDF material prepared with PVDF solution in DMSO, phase-separation temperature of −18° C., high magnification.
Figure 10D:
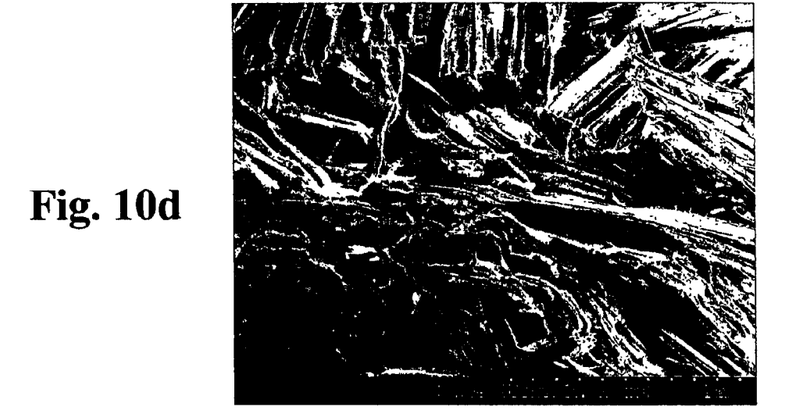
FIG. 10d is a SEM micrograph of porous PVDF material prepared with PVDF solution in DMSO, phase-separation temperature of −70° C., low magnification.
Figure 10E:
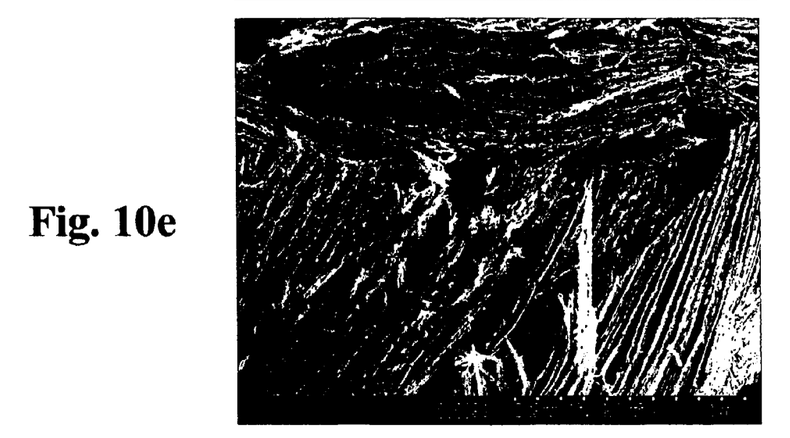
FIG. 10e is a SEM micrograph of porous PVDF material prepared with PVDF solution in DMSO, phase-separation in liquid nitrogen, low magnification.

5. PA-6,6 and PA-6 Blends in Formic Acid and Water:

The gelation was observed for the solution of PA-6,6/PA-6 (50/50) with a mixed solvent of formic acid and water (70/30). The gelation temperature ranged from room temperature to liquid nitrogen. The morphologies of the foams are shown in FIGS. 8a–8c. FIGS. 8a–8c are complex porous structures with nano fibrous architecture.

6. PA-6 in Acetic Acid and Water:

PA-6 was completely dissolved in acetic acid/water co-solvent with water content ranging from 0 to 40%. Gelation of the solution was observed when water content was higher than 30%. The gelation temperature was from room temperature to liquid nitrogen. The typical morphologies of the foam are shown in FIG. 9. FIGS. 9a–9d are complex porous structures with nano fibrous architecture.

7. PVDF in Dimethylsulfoxide (DMSO):

PVDF was easily dissolved in DMSO, and gelation occurred at a wide range of temperatures. With the new phase-separation and freeze-drying techniques, porous materials with complex architectures were formed. They had fibrous architecture, and the fibers were further composed of smaller features at the micrometer scale. Typical morphologies are shown in FIGS. 10a–10e. FIGS. 10a–10e are micro fibrous.

Mechanical Properties and Specific Surface Area:

In the examples of the present invention described above, the generated highly porous materials have many interesting architectural features, which are novel. They have high potential to be used in a variety of biomedical, industrial and household applications. For many of these applications, a high specific surface area and the mechanical integrity are important.

For some of the porous materials generated (FIG. 6), the specific surface area and mechanical properties are characterized. The compressive moduli are 5.22±0.77 kPa and 7.36±4.11 kPa for a PA-6,6 foam generated from 10% PA-6,6 solution in formic acid/water (70/30) and a PA-6,6 foam generated from 5% PA-6,6 solution in formic acid/THF (40/60) respectively. The mechanical properties for such highly porous materials are excellent.

The specific surface area of a PA-6,6 foam prepared from 5% PA-6,6 solution in formic acid/THF (40/60) is 55 m$^2$/g (BTE method), which is substantially higher than those currently on the market (typically lower than 5 m$^2$/g).

As disclosed herein, the present invention comprises non-degradable porous materials having very high surface areas, and methods for fabricating the same. A variety of 3D architectures with features at the nanometer and/or micrometer scales may advantageously be generated. The materials may be synthetic polymers, natural macromolecules, or their derivatives. They may be hydrophilic, hydrophobic, or amphiphilic. Further, the materials may be homo-polymers, co-polymers, blends, mixtures, or composites of polymers. The novel porous materials may advantageously be used in a variety of applications including medical devices (eg. artificial kidney, dialysers), matrix materials for chemical reactors, bioreactors, controlled release devices, wound dressings, separation membranes, filters, catalysis systems, absorbents, packaging and insulating materials. Further, the porous materials may be desirable for use as tissue engineering scaffolds for a variety of applications, including implants.

While preferred embodiments, forms and arrangements of parts of the invention have been described in detail, it will be apparent to those skilled in the art that the disclosed embodiments may be modified. Therefore, the description herein is to be considered exemplary rather than limiting, and the true scope of the invention is that defined in the following claims.

What is claimed is:

1. A porous material, comprising:
   at least one non-degradable polymer; and
   pores having a size and connections therebetween, wherein the pore sizes range between about 30 μm and about 300 μm, and wherein the connections range in size between about 30 μm and about 300 μm, wherein the porous material porosity is greater than about 80%;
   wherein the porous material is mechanically strong and has a high specific surface area ranging between about 10 m$^2$/g and about 1000 m$^2$/g, and has an architecture comprising at least one of nano fibrous, micro fibrous, non fibrous, complex porous structure with nano fibrous architecture, and mixtures thereof.

2. The porous material as defined in claim 1 wherein the at least one non-degradable polymer comprises at least one of natural or synthetic hydrophilic polymers, natural or synthetic hydrophobic polymers, natural or synthetic amphiphilic polymers, and mixtures thereof.

3. The porous material as defined in claim 2 wherein the at least one non-degradable polymer is a hydrophilic polymer comprising at least one of polyvinyl alcohol, polyethylene oxide, polymethacrylic acid (PMAA), polyacrylic acid, polyethylene glycol, alginate, collagen, gelatin, hyaluronic acid, and mixtures thereof.

4. The porous material as defined in claim 2 wherein the at least one non-degradable polymer is a hydrophobic polymer comprising at least one of polytetrafluoroethylene (PTFE), polyvinylchloride (PVC), polyamides (PA, Nylons), polyethylenes (PE), polysulfones, polyethersulphone, polypropylenes (PP), silicon rubbers, polystyrenes, polycarbonates, polyesters, polyacrylonitrile (PAN), polyimides, polyetheretherketone (PEEK), polymethylmethacrylate (PMMA), polyvinylacetate (PVAc), polyphenylene oxide, cellulose and its derivatives, polypropylene oxide (PPO), polyvinylidene fluoride (PVDF), polybutylene, and mixtures thereof.

5. The porous material as defined in claim 1 wherein the porosity is greater than approximately 85%.

6. The porous material as defined in claim 5, wherein the porosity is greater than approximately 90%.

7. The porous material as defined in claim 6, wherein the porosity is approximately 98%.

8. The porous material as defined in claim 1 wherein the porous material has a specific surface area ranging between about 10 m$^2$/g and about 500 m$^2$/g.

9. The porous material as defined in claim 8 wherein the porous material has a specific surface area ranging between about 20 m$^2$/g and about 200 m$^2$/g.

10. The porous material as defined in claim 1 wherein the porous material comprises pores having a size and connections therebetween, wherein the pore sizes range between about 50 μm and about 100 μm, and wherein the connections range in size between about 50 μm and about 100 μm.

11. A porous material formed by a process, comprising:
    mixing at least one non-degradable polymer with a solvent to provide a polymer/solvent mixture, wherein the at least one non-degradable polymer comprises at least one of natural or synthetic hydrophilic polymers, natural or synthetic hydrophobic polymers, natural or synthetic amphiphilic polymers, and mixtures thereof;
    heating the mixture to a temperature ranging between about room temperature and about 100° C.;
    gelling the mixture by rapidly transferring the mixture to a cooling device maintained at a temperature between about room temperature and about liquid nitrogen; and
    treating the gel under predetermined conditions whereby a substantially solvent free porous material is created having a porosity greater than about 85%;
    wherein the resultant porous material is mechanically strong and has a high specific surface area ranging between about 10 m$^2$/g and about 1000 m$^2$/g, and has an architecture comprising at least one of nano fibrous, micro fibrous, non fibrous, complex porous structure with nano fibrous architecture, and mixtures thereof;
    and wherein the porous material comprises pores having a size and connections therebetween, wherein the pore sizes range between about 30 μm and about 300 μm, and wherein the connections range in size between about 30 μm and about 300 μm.

12. A porous material, comprising:
    at least one non-degradable polymer; and
    pores having a size and connections therebetween, wherein the pore sizes range between about 30 μm and about 300 μm, and wherein the connections range in size between about 30 μm and about 300 μm, wherein the porous material porosity is greater than about 80%;
    wherein the porous material is mechanically strong and has a high specific surface area ranging between about 10 m$^2$/g and about 1000 m$^2$/g, and has an architecture comprising at least one of micro fibrous, non fibrous, and mixtures thereof.

* * * * *